United States Patent [19]

Berg

[11] 4,367,893
[45] Jan. 11, 1983

[54] GRIPPING DEVICE

[75] Inventor: Arne Berg, Västerås, Sweden

[73] Assignee: ASEA Aktiebolag, Västerås, Sweden

[21] Appl. No.: 224,904

[22] Filed: Jan. 14, 1981

[30] Foreign Application Priority Data

Jan. 17, 1980 [SE] Sweden .................................. 8000382

[51] Int. Cl.³ .............................................. B25J 15/00
[52] U.S. Cl. ..................... 294/106; 269/156; 294/86 R; 294/115
[58] Field of Search ............. 294/67 BC, 86 R, 87 R, 294/95, 97, 106, 113–116; 81/308, 310, 358; 269/156, 227, 237

[56] References Cited

U.S. PATENT DOCUMENTS 3,530,792 9/1970 Valiela ..................... 269/156 X

FOREIGN PATENT DOCUMENTS 53-64362 6/1978 Japan .................... 294/106
54-110559 8/1979 Japan .................... 294/86 R
610668 5/1978 U.S.S.R. ................. 294/86 R

*Primary Examiner*—Johnny D. Cherry
*Attorney, Agent, or Firm*—Watson, Cole, Grindle & Watson

[57] ABSTRACT

Gripping device (1), primarily intended for handling objects of circular cross-section such as shafts, round metal plates or rings with the aid of industrial robots. It comprises three parallel shafts (10a, b, c) with gripping arms with gripping members (11a, b, c). The shafts (10a, b, c) are rotatably journalled in a plane supporting member (2, 3). A drive motor (16) drives one shaft (10a). The other shafts (10b, 10c) are connected together with the driven shaft (10a) by means of gear wheels (14a, b, c), one on the driven shaft (10a) and one on either of the other two shafts (10b, 10c), and two racks (20a, 20b) in mesh with the gear wheel (14a) on the driven shaft (10a) and one of the gear wheels (14b, 14c) on the other shafts (10b, 10c).

8 Claims, 9 Drawing Figures

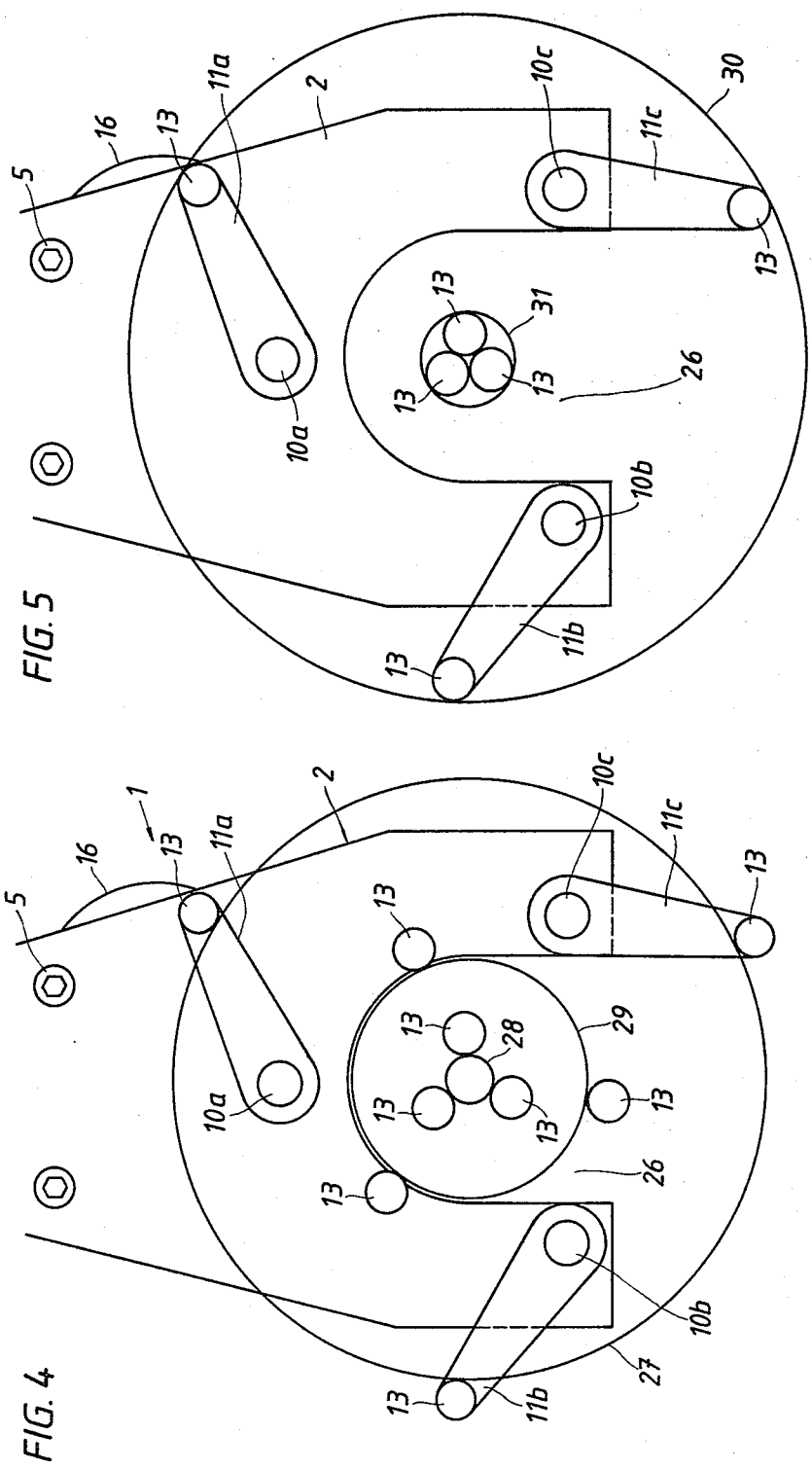

GRIPPING DEVICE

The invention relates to a gripping device which is primarily intended for handling objects of circular cross-section with the aid of industrial robots. The gripping device may be used for handling shafts, round metal plates or rings.

One object of the invention is to provide a gripping device which is capable of gripping a round metal plate as well as a shaft or a ring. The ring shall be gripped internally or externally.

Another object is to be able to grip objects of a large as well as a small diameter with the same gripping device and that the gripping device shall be capable of centering the object.

A further object is to provide a gripping device which is capable of gripping objects with relatively great faults in their position, i.e. the gripping device shall be capable of gripping objects whose centre deviates considerably from the ideal position.

The gripping device according to the invention comprises three parallel shafts with gripping arms which are provided with gripping members at their extreme ends. These shafts are journalled in a supporting member, which may consist of one single plate or two parallel plates which are spaced apart somewhat from one another. The plates are retained by a number of spacers. A drive motor for the gripping movement is connected to drive one of the shafts of the gripping arms, either directly or via a gear unit in the gripping device. The driven gripping arm shaft and the other shafts are interconnected via gear wheels and racks extending between the gear wheels in order to obtain a synchronous swinging motion of the gripping arms. By constructing the supporting member with two parallel plates, a good rigidity and a stable practical double journalling of the shafts of the gripping arms may be achieved, if the weight is low. The interconnecting gear wheels and racks and a possible gear unit between the drive motor and the driven shaft are then located between said plates.

For manipulating elongated objects such as shafts or tubes, the gripping device is suitably constructed with two parallel gripping units having individual gripping arms and an individual drive motor for said arms. The plate-shaped supporting members in these gripping units are then located at a certain distance from each other, oriented parallel to each other and at different planes. The gripping arms are positioned on the outer sides of the supporting members, thus obtaining the largest distance between the gripping points and the best stability. It is also possible to construct the gripping device with two parallel gripping units at a distance from each other but oriented at the same plane. In such a gripping device, the smallest movement when removing and inserting details in a converting machine may be obtained. The shortest manipulating time is also obtained. If the gripping device shall be used for manipulating details of an appreciable length, the plate-shaped supporting member is formed with a U-shaped opening which extends in between the shafts of the two gripping arms, which shafts are driven by racks.

The invention will be described in greater detail with reference to the accompanying Figures.

FIGS. 4 and 5 show how cylindrical objects are gripped from outside and rings from inside.

Figure 1:
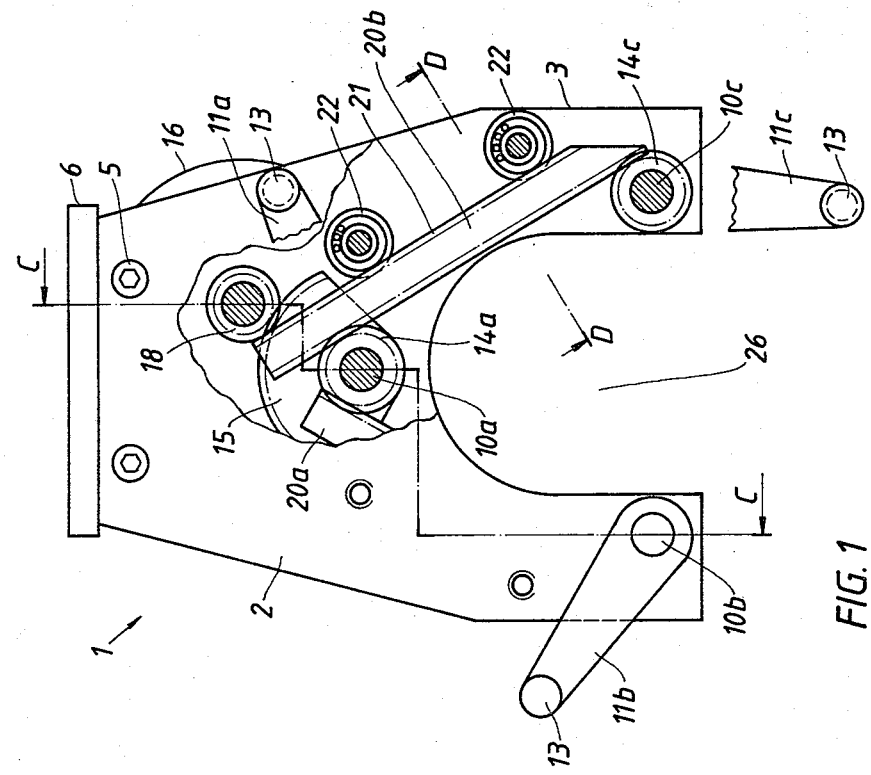
FIG. 1 shows a view A—A and a section B—B of the gripping device as indicated in FIG. 2.
Figure 2:
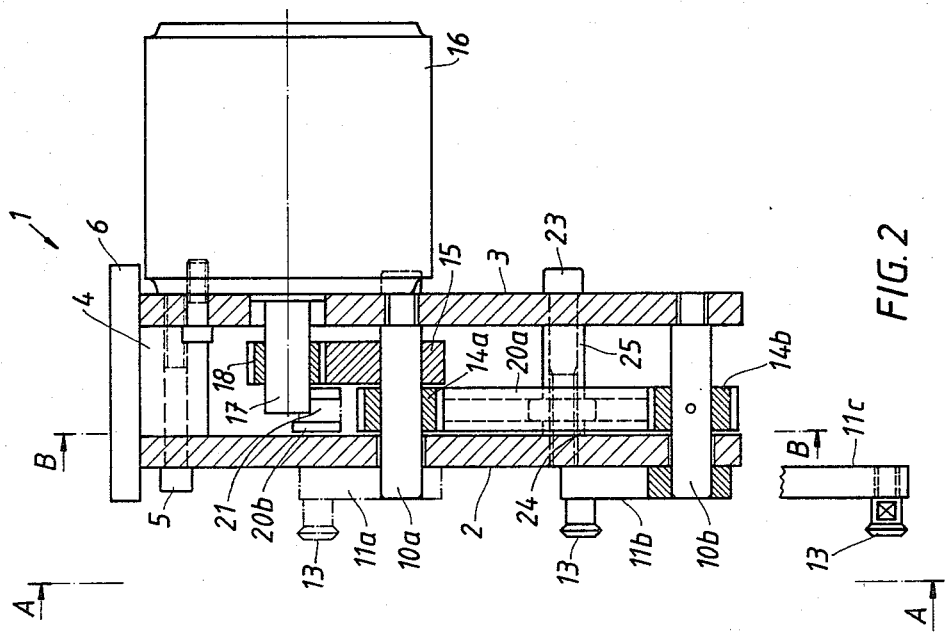
FIG. 2 shows a section as indicated by C—C in FIG. 1.
Figure 3:
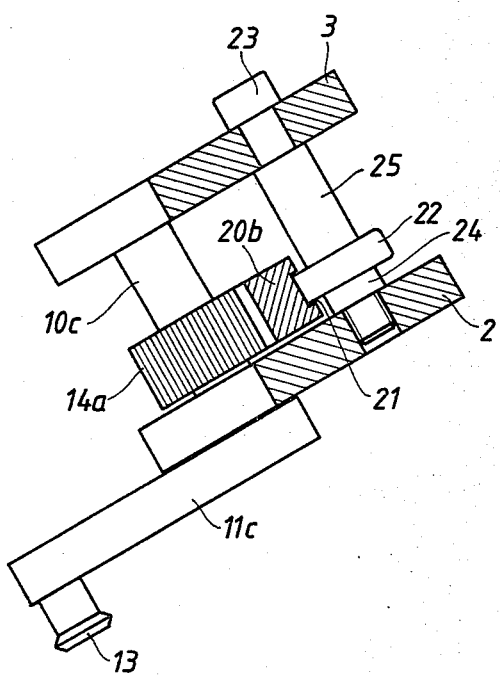
FIG. 3 shows a section according to D—D in FIG. 1.

In the figures, 1 designates a gripping device which comprises a plate-shaped supporting member, which is built up from two parallel plates 2 and 3 which are joined to a mounting plate 6 via spacers 4, the retaining bolts 5 and other bolts (not shown), said mounting plate 6 connecting the gripping device with a tool holder 7 on the outer arm 8 of a robot. Three shafts 10a, 10b and 10c with gripping arms 11a, 11b and 11c are journalled in needle bearings in the plates 2 and 3. At their extreme ends the arms 11 support the gripping members 13. Gear wheels 14a, 14b and 14c are attached to the shafts 10. Attached to the shaft 10a is also a gear segment 15. A drive motor 16 is joined to the plate 3. The shaft pin 17 of the drive motor supports a gear wheel 18, which is in engagement with the toothed segment 15. Gear wheels 14a and 14b are connected together by rack 20a and gear wheels 14a and 14b by rack 20b. At their rear side the racks are formed with a longitudinal slot 21. Ball bearings 22, which are supported by bolts 23 and which are fixed axially by spacing tubes 24 and 25, run in slot 21, guide racks 20a and 20b and maintain them in engagement with gear wheels 14a, 14b and 14a, 14c, respectively. When operating the gripping arm 11a, which is fixedly joined to shaft 10a, gripping arms 11b and 11c will synchronously follow gripping arm 11a. Plates 2 and 3 are made with U-shaped openings 26, into which an elongated object may be inserted.

FIG. 4 shows how objects can be gripped externally with the gripping device 1 according to the invention. Circle 27 shows the outer contour of the largest object that may be gripped. This object, for example a round plate, may only have a limited axial extension since it must be positioned entirely at the side of the gripping device 1. Circle 28 shows the contour of the smallest object that may be gripped. Circle 29 shows the contour of the largest elongated object, for example a shaft, that may be gripped. Long objects have to be gripped at their centre, possibly simultaneously by two cooperating gripping devices. Such objects must extend into the U-shaped opening in plates 2 and 3, so the dimensions of this opening limit the diameter of the object that may be gripped. The gripping device may be constructed so as to be capable of gripping objects having an outside diameter of from 18 mm to 200 mm. The gripping device is capable of gripping an object even if it is considerably misplaced. The gripping force is good for all sizes of objects.

FIG. 5 shows how to grip objects internally with the gripping device accordingto the invention. Circle 30 shows the inner contour of the object with the largest opening, for example a ring, that may be gripped. Circle 31 shows the inner contour of the detail with the smallest opening, for example a ring, that may be gripped. Objects having an inside diameter of from 50 mm to 200 mm may be gripped. One single gripping device may be used for objects of very varying sizes and need not be replaced when exchanging objects to the same extent as gripping devices used so far.

Figure 6:
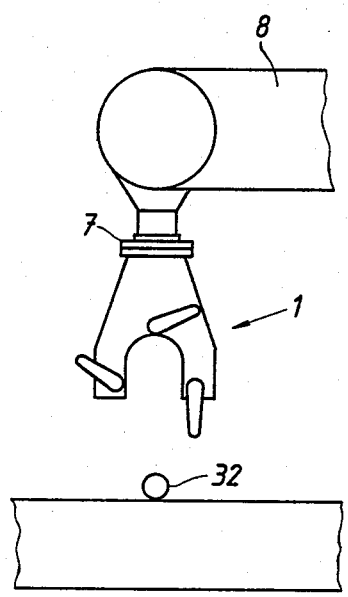
FIGS. 6–9 show different locations of the gripping device on a robot arm.
Figure 7:
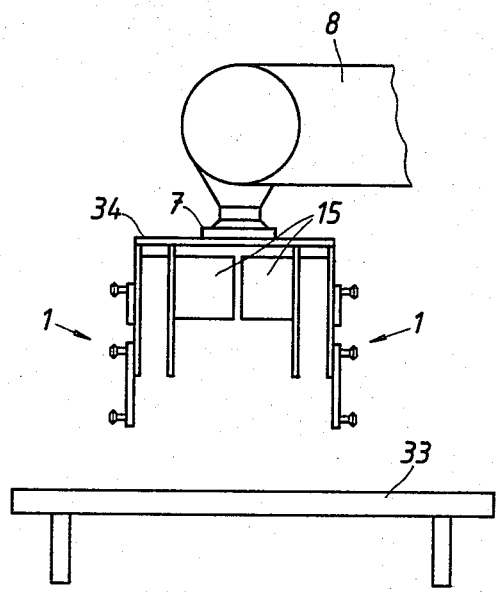
Figure 8:
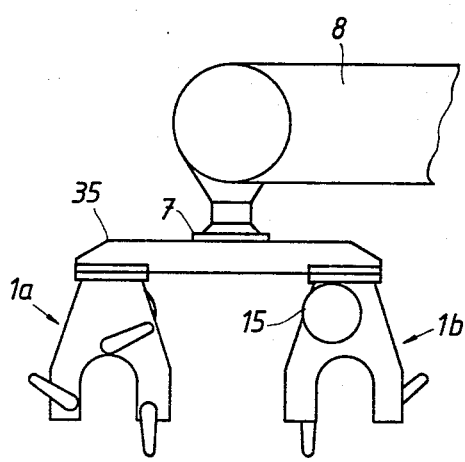

As shown in FIG. 6, one single gripping device 1 may be attached to the rotatable tool holder 7 of the robot. This arrangement is appropriate when manipulating objects 32 having a small axial extension. FIG. 7 shows an arrangement for manipulating long objects, such as shafts 33. Two gripping devices are attached to a plate 34 which is attached to the tool holder 7. FIG. 8 shows another arrangement of gripping devices 1a, 1b which are mounted pairwise on a beam 35, which is attached to the tool holder 7. With this arrangement, an object may be removed from a converting machine with one gripping device 1, whereafter the whole gripping device unit on the beam 35 is rotated 180°, an object in the second gripping device 1b then being inserted in the machine. During the machining of the now inserted object, the robot delivers the finished object and grips a new one and then assumes a position of readiness up to the moment when the working of the object in the machine has been terminated.

Figure 9:
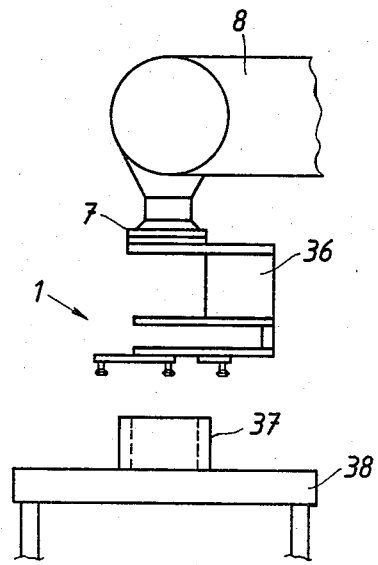

FIG. 9 shows the attachment of a gripping device in a bracket 36, which is fixed to the tool holder 7. This arrangement is suitable for picking up objects 37, such as round plates, shorter cylinders or tubes, from a table 38. Tubes may optionally be gripped externally or internally.

I claim:

1. A gripping device for manipulating objects, comprising:
   a support member;
   first, second and third shafts rotatably journaled in said support member and carrying respective gear wheels and gripping arms rotatable with the respective shaft and gear wheels;
   a first rack member interconnected with the gear wheels of said first and second shafts;
   a second rack member interconnected with the gear wheels of said first and third shafts; and
   a drive motor connected to rotate said first shaft such that rotation thereof causes movement of said first and second rack members and commensurate rotation of said second and third shafts by means of the respective gear wheels carried thereon to synchronously rotate the gripping arms to grasp and ungrasp an object.

2. Gripping device according to claim 1 wherein the supporting member includes two plates mounted at a distance from one another, said first, second and third shafts being journalled in said plates, and the gear wheels and said first and second rack members are positioned between said plates.

3. Gripping device according to claim 1 or 2, wherein the supporting member is formed with a U-shaped opening which extends between said second and third shafts.

4. A gripping unit for manipulating objects, comprising:
   a first and second support member;
   first, second and third shafts rotatably journaled in each of said first and second support members and carrying respective gear wheels and gripping arms rotatable with the respective shaft and gear wheels;
   a first rack member interconnected with the gear wheels of said first and second shafts in each of said first and second support members;
   a second rack member interconnected with the gear wheels of said first and third shafts in each of said first and second support members; and
   a drive motor connected to rotate said first shaft in each of said first and second support members such that rotation thereof causes movement of the respective first and second rack members and commensurate rotation of the respective second and third shafts by means of the respective gear wheels carried thereon to synchronously rotate the respective gripping arms in each of said first and second support members to grasp and ungrasp an object therebetween, with each of the respective gripping arms being oppositely disposed with respect to one another.

5. Gripping unit according to claim 4 wherein each of said first and second supporting members includes two plates mounted at a distance from one another, said first, second and third shafts in each of said first and second supporting members being journaled in each of the respective two plates, and the gear wheels and said first and second rack members of each of said first and second supporting members being positioned between the respective two plates.

6. Gripping unit according to claim 4 or 5 wherein each said first and second supporting member is formed with a U-shaped opening extending between each respective second and third shafts.

7. Gripping unit according to claim 6 wherein the plate-formed first and second supporting members are oriented in two different parallel-spaced planes in spaced relationship.

8. Gripping unit according to claim 6 wherein the plate-formed first and second supporting members are spaced from one another in the same plane.

* * * * *